United States Patent
Kohler

(10) Patent No.: US 10,503,142 B2
(45) Date of Patent: Dec. 10, 2019

(54) METHOD AND DEVICE FOR CONTROLLING A MILLING MACHINE

(71) Applicant: DR. JOHANNES HEIDENHAIN GmbH, Traunreut (DE)

(72) Inventor: Frieder Kohler, Lauter (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 117 days.

(21) Appl. No.: 15/660,880

(22) Filed: Jul. 26, 2017

(65) Prior Publication Data

US 2018/0039252 A1 Feb. 8, 2018

(30) Foreign Application Priority Data

Aug. 2, 2016 (DE) .......... 10 2016 214 228

(51) Int. Cl.
*G05B 19/406* (2006.01)

(52) U.S. Cl.
CPC .. *G05B 19/406* (2013.01); *G05B 2219/34427* (2013.01); *G05B 2219/45145* (2013.01)

(58) Field of Classification Search
CPC ........ G05B 19/406; G05B 2219/45145; G05B 2219/34427
USPC ........................................................ 700/160
See application file for complete search history.

(56) References Cited

U.S. PATENT DOCUMENTS

| | | | | |
|---|---|---|---|---|
| 5,671,679 A | * | 9/1997 | Straub ............... | E01B 29/24 104/17.1 |
| 5,822,212 A | | 10/1998 | Tanaka et al. | |
| 2003/0033029 A1 | * | 2/2003 | Kohler ............... | G05B 19/4103 700/13 |
| 2003/0231793 A1 | * | 12/2003 | Crampton .......... | G01B 11/2518 382/154 |
| 2009/0112490 A1 | * | 4/2009 | Matlis ................ | G01F 15/00 702/47 |
| 2010/0034609 A1 | * | 2/2010 | Doppenberg ...... | B23Q 11/0039 409/131 |
| 2012/0181969 A1 | | 7/2012 | Kohler | |

FOREIGN PATENT DOCUMENTS

| | | |
|---|---|---|
| DE | 10139638 A1 | 2/2003 |
| DE | 102010019419 A1 | 11/2011 |
| DE | 102011089014 A1 | 7/2012 |
| DE | 102013202408 | 8/2014 |
| WO | WO2011137891 * 10/2011 | ............. B23Q 17/09 |

OTHER PUBLICATIONS

WO2011137891 Translation (Year: 2011).*
European Search Report dated Dec. 14, 2017, in EP Application No. 17169479.

* cited by examiner

*Primary Examiner* — Michael J Brown
(74) *Attorney, Agent, or Firm* — Hunton Andrews Kurth LLP

(57) ABSTRACT

In a method for controlling a milling machine, a milling operation is able to be monitored on the basis of a temporally variable parameter of a numerical control in that the parameter is monitored for the exceeding or undershooting of a limit value during the milling operation. The method includes filtering out the tooth-meshing frequency in the time characteristic of the parameter (Iqnom).

14 Claims, 2 Drawing Sheets

METHOD AND DEVICE FOR CONTROLLING A MILLING MACHINE

CROSS-REFERENCE TO RELATED APPLICATIONS

The present application claims priority to Application No. 10 2016 214 228.3, filed in the Federal Republic of Germany on Aug. 2, 2016, which is expressly incorporated herein in its entirety by reference thereto.

FIELD OF THE INVENTION

The present invention relates to a method and a device for controlling a milling machine. The method is employed, for example, to monitor a milling operation so that countermeasures are able to be taken when undesired states arise during the processing of a workpiece.

BACKGROUND INFORMATION

A system for monitoring a machine tool is described, for example, in U.S. Pat. No. 5,822,212. The load of a spindle that is driving a processing tool is monitored. This load is ascertained on the basis of the time characteristic of the current by which the spindle is driven. For the monitoring, values for the spindle load are first ascertained on the basis of testing operations and used as reference values during later processing operations. If the spindle load during these later processing operations deviates from the reference value by more than a still tolerable amount, an alarm will be generated. Then, for example, an interruption of the processing operation may be triggered. Such excessive deviations may be produced by a dull or also a broken tool so that such monitoring is able to prevent more serious damage to a tool.

However, such monitoring devices are frequently also triggering when the triggering would actually not be required. This is frequently the case when processing particularly hard metals such as nickel-chromium alloys known under the trade name of INCONEL. Such alloys can be machined only at particularly low rotational speeds of the tool. Here, conventional monitoring for a lower limit value for the rotational speed quickly leads to a switch-off of the machine tool in case of an overload. Other parameters suitable for the monitoring, e.g., the spindle load, are heavily superposed by the tooth meshing frequency of the tool, which may likewise lead to unnecessary shut-offs.

German Published Patent Application No. 10 2013 202 408 describes dampening chatter vibrations during the milling operation by the action of a filter in the control loop of the drives of a machine tool, the maximum damping of the filter being set to a frequency that takes the instantaneous tooth meshing frequency into account. However, this filter is not suitable for monitoring the milling operation.

SUMMARY

Example embodiments of the present invention provide a method and a device for monitoring a milling operation, by which an undesired state of the machine tool is able to be detected in a timely manner. The detection may be robust with regard to false triggering to ensure that no unnecessary interruptions occur in the milling operation, if possible.

According to an example embodiment of the present invention, a method for controlling a milling machine includes monitoring the milling on the basis of a temporally variable parameter of a numerical control by monitoring the parameter for the exceeding or undershooting of a limit value during the milling operation. According to the method, the tooth meshing frequency of a rotating milling tool is filtered out in the time characteristic of the parameter.

The foregoing makes it possible to achieve a considerably more robust monitoring of the milling operation inasmuch as the effect of the tooth meshing frequency, which is clearly superimposed to the monitored parameter, is considerably reduced, and false triggering of the monitoring merely on the basis of the tooth engagement is avoided.

In an effort to minimize the circuitry outlay and the computing power required for filtering the tooth-meshing frequency, a special sequence of processing steps is provided for the monitored parameter. For example, this parameter, which is initially detected at a fixed frequency, is processed in a scanning-rate converter, which outputs the parameter at a variable clock pulse. This variable clock pulse corresponds to a multiple of the instantaneous tooth-meshing frequency, for which the tenfold tooth-meshing frequency may be utilized.

Due to this scanning-rate conversion, a moving-average filter having a particularly simple configuration is subsequently able to be used in order to largely rid the monitored parameter of the influence of the tooth meshing. The resources of the numerical control are spared in this manner, and the computational power required for filtering the tooth-meshing frequency is able to be kept low.

The parameter may include, for example, a state variable, a value, or a signal that describes the instantaneous state of the system that includes the numerical control and the milling machine. This parameter, for example, is measured by a sensor or is derived by the numerical control from measured values, possibly also with reference to a setpoint value. A corresponding response is to be elicited if a limit value for such a parameter is exceeded or undershot.

The method may include processing the parameter, measured in a fixed clock rate, by a scanning-rate converter, the scanning-rate converter outputting the parameter with a variable clock pulse for further processing.

The variable clock pulse may correspond to a multiple of, e.g., five to twenty times and/or ten times, the tooth-meshing frequency of the milling tool, the tooth-meshing frequency corresponding to a product of a rate of rotation of the milling tool and a number of cutting blades of the milling tool.

The tooth-meshing frequency may be filtered out of the parameter output with a variable clock rate by averaging, by a moving-average filter, across a number of values that corresponds to the multiple of the tooth-meshing frequency.

The method may include integrating the parameter in the moving-average filter in an integration stage and subsequently differentiating the parameter in a differentiation stage.

The differentiation stage may include a shift register having a number of register slots, e.g., ten register slots, that corresponds to the multiple of the tooth-meshing frequency, through which consecutive parameter values are shifted at a time delay.

The method may include converting the parameter at an input of the moving-average filter from a floating point number to an integer number, and converting the parameter at an output of the moving-average filter from an integer number to a floating point number.

The method may include triggering a warning and/or a termination of the milling operation in accordance with a comparison of the parameter output at an output of the moving-average filter with a limit value.

According to an example embodiment of the present invention, a numerical control for controlling a milling operation on a machine tool includes: a monitor unit adapted to monitor a temporally variable parameter of the numerical control with the aid of a limit value; and an averaging filter adapted to filter out a tooth-meshing frequency from a time characteristic of the parameter.

The averaging filter may include a moving-average filter having an integration stage and a downstream differentiation stage.

The differentiation stage may include a shift register having a number of register slots, e.g., ten register slots, that corresponds to a multiple of the tooth-meshing frequency, the shift registers adapted to store consecutive parameter values.

The numerical control may include a scanning-rate converter connected upstream from the averaging filter adapted to output, at a variable scanning rate, the parameter, supplied at a fixed scanning rate.

The variable scanning rate may correspond to a multiple of the fixed scanning rate. For example, the variable scanning rate may correspond to (a) five to twenty and/or (b) ten times a tooth-meshing frequency of the milling tool, the tooth-meshing frequency corresponding to a product of a rate of rotation of the milling tool and a number of cutting blades of the milling tool.

Additional features and aspects of example embodiments of the present invention are described in more detail below with reference to the appended Figures.

DETAILED DESCRIPTION

Figure 1:
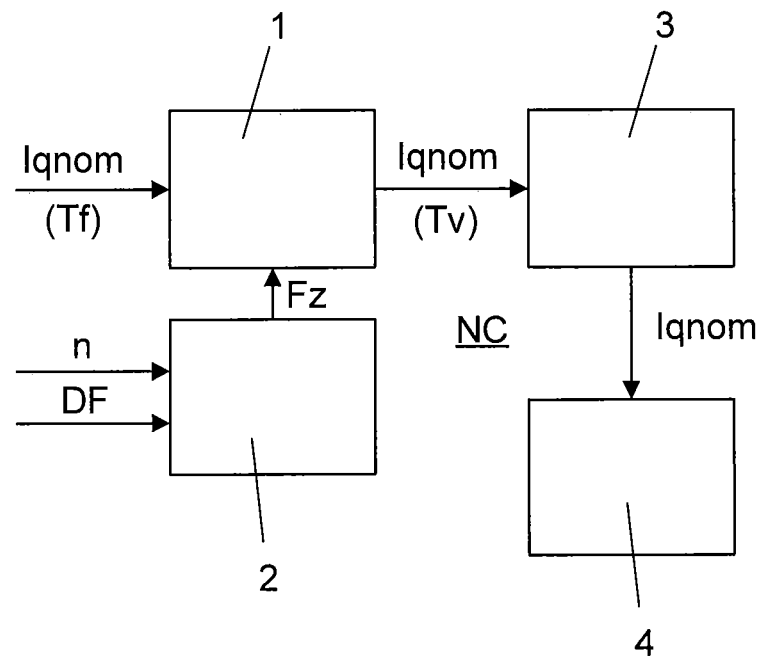
FIG. 1 schematically illustrates the interaction of the scanning-rate converter and the moving-average filter.

FIG. 1 schematically illustrates the interaction of a scanning-rate converter 1 and a moving-average filter 3, which may be provided as a software module in numerical control NC of a milling machine, for example.

The number n of cutting blades of a tool, stored in a tool table within numerical control NC, for example, and instantaneous rate of rotation DF of the spindle are forwarded to an arithmetic unit 2. By multiplying the two values, arithmetic unit 2 calculates instantaneous teeth-meshing frequency FZ and outputs it to scanning-rate converter 1.

The measured value of parameter Iqnom utilized for the monitoring is forwarded to the scanning-rate converter 1, i.e., in a fixed clock pulse Tf. In the example, the setpoint current for the drive of the spindle rotating the milling tool, which is regulated by numerical control NC and to a certain degree is proportional to instantaneous spindle load, is utilized as parameter Iqnom. Ideally, setpoint current Iqnom corresponds to the measured actual current for the spindle drive. Since the meshing of each tooth of the rotating milling tool with the workpiece decelerates the spindle, control NC responds by a rise in setpoint current Iqnom, as illustrated as unfiltered signal a of FIG. 4.

Scanning-rate converter 1 forwards this parameter Iqnom at a variable clock pulse Tv. Variable clock pulse Tv is selected such that it corresponds to a whole-number multiple of tooth-meshing frequency FZ. For example, a tenfold tooth-meshing frequency FZ as the variable clock pulse Tv may be utilized and may provide an appropriate compromise between low circuitry outlay (or computational power) and excellent damping of tooth-meshing frequency FZ in the subsequently resulting signal. A range from five to twenty times the tooth-meshing frequency FZ may be similarly utilized.

Parameter Iqnom, thusly converted in its scanning rate, is forwarded to a moving-average filter 3, which averages a certain number of the most recently transmitted values of parameter Iqnom, i.e., a number that corresponds to the previously used multiple of tooth-meshing frequency FZ. Thus, in the example, averaging across the most recent ten values takes place, and parameter Iqnom thusly averaged is output to a monitoring unit 4. The fact that tooth-meshing frequency FZ has been damped considerably in this averaged signal is apparent from signal b of FIG. 4, especially when comparing it with unfiltered signal a.

Figure 2:
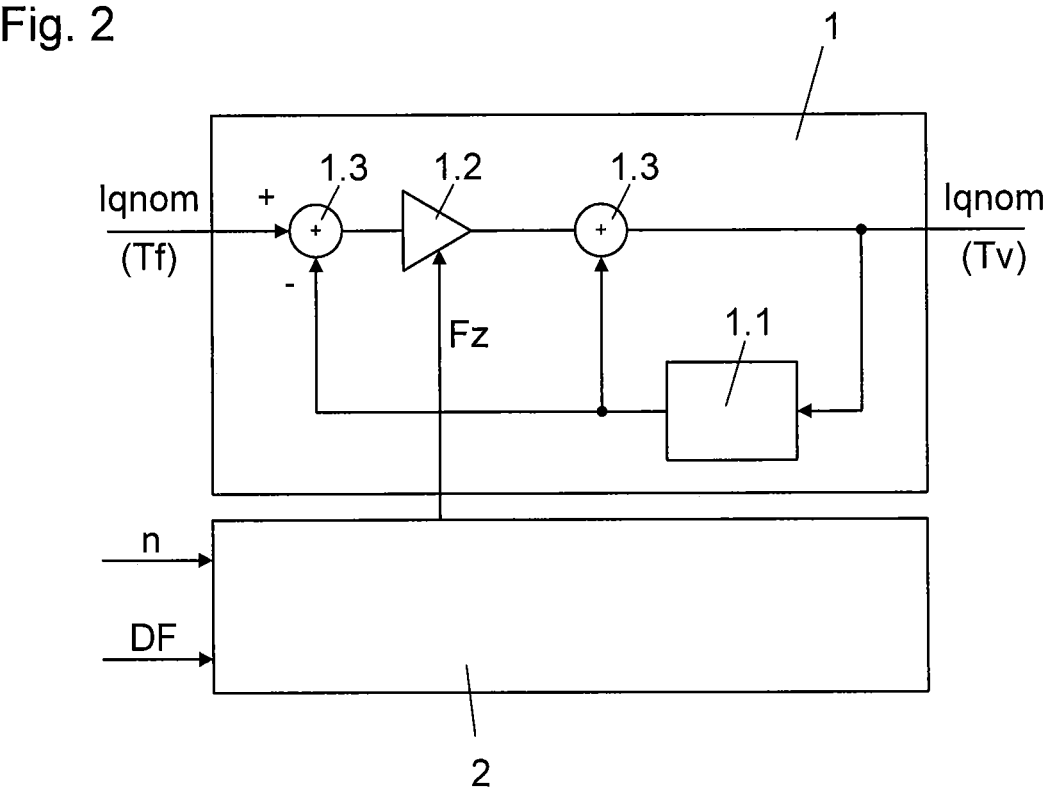
FIG. 2 schematically illustrates a scanning-rate converter.

FIG. 2 schematically illustrates an exemplary embodiment of a scanning-rate converter 1. Other circuits, e.g., decimation filters, cascaded integrator-comb filters, and circuits that are able to convert a signal to a desired scanning rate may be provided, as well.

With the aid of a delay element 1.1, a linear amplifier 1.2, and two summing points 1.3, scanning-rate converter 1 makes it possible to output parameter Iqnom at the output of scanning-rate converter 1 with a variable clock pulse Tv that corresponds to ten times the tooth-meshing frequency ZF. Typical values are a tooth-meshing frequency of 60 Hz (at n=6 teeth and a spindle rate of rotation DF=600 rotations per minute, corresponding to 10 Hz), from which a variable clock pulse Tv of 600 Hz results.

Fixed clock pulse Tf, at which parameter Iqnom is initially detected, is in the range from 3.3 kHz to 20 kHz, and preferably at 5 kHz, for example.

Figure 3:
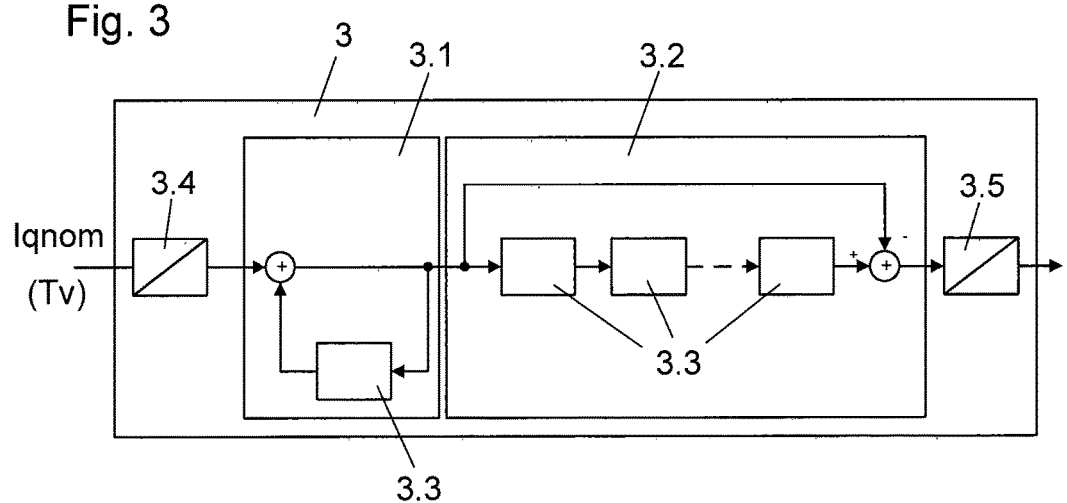
FIG. 3 schematically illustrates a moving-average filter.

FIG. 3 schematically illustrates an exemplary embodiment of a moving-average filter 3 to which parameter Iqnom is supplied at a variable clock pulse Tv.

In order to avoid errors in the subsequent calculation, the circuit illustrated in FIG. 3 uses integer values for its calculation. As a result, parameter Iqnom is first converted in a converter 3.4 from a floating point number into an integer number. This is followed by an integration stage 3.1, which integrates parameter Iqnom. Differentiation stage 3.2 that follows differentiates the thusly obtained value again, this being done in an especially uncomplicated manner by shifting the values through a shift register having register slots 3.3, whose number substantially corresponds to the selected multiple of tooth-meshing frequency FZ. In the example, ten register slots 3.3 are therefore required. It is then sufficient to generate the difference of the values upstream and downstream from the shift register and to output them as filtered parameter Iqnom.

There exists a certain time delay between individual register slots 3.3, which is constant at a constant tooth-meshing frequency FZ. In an effort to obtain an excellent filter effect even at an accelerating rotary motion of the tool, i.e., at a varying tooth-meshing frequency FZ, the individual delay times are selected to differ. It should apply at all times that the sum of all delay times corresponds to the time required for a single spindle rotation, divided by the number n of teeth of the tool.

After a renewed conversion from an integer number into a floating point number in a further converter 3.5, the filtered value of parameter Iqnom is able to be forwarded to a monitoring unit 4, which carries out monitoring for an exceeding or undershooting of limit values and is able to carry out a switch-off reaction or output a warning as the case may be.

Figure 4:
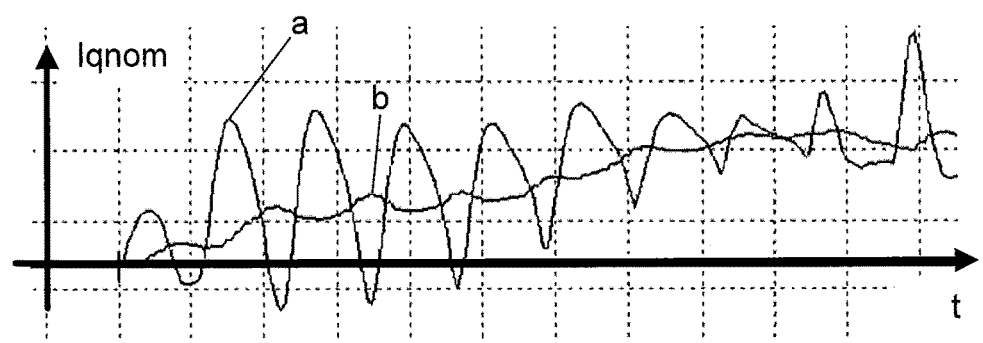
FIG. 4 illustrates effect of the filtering on the measuring signal of the parameter.

Due to the filtering of tooth-meshing frequency FZ in the time characteristic of parameter Iqnom, which can be seen by comparing signals a and b illustrated in FIG. 4, monitoring of the processing operation that is considerably less susceptible to interference is able to be carried out using filtered signal b. The method and the device described herein are suitable for monitoring numerically controlled machine tools in which a rotating tool having one or more cutting blades processes a workpiece, the cutting blades periodically engaging with the workpiece. Such machine tools are also referred to as milling machines.

What is claimed is:

1. A method for controlling a milling machine, comprising:
   monitoring a milling operation with the aid of a temporally variable parameter of a numerical control;
   monitoring the parameter for exceeding or undershooting a limit value during the milling operation;
   filtering out a tooth-meshing frequency of a milling tool in a time characteristic of the parameter; and
   processing the parameter, measured in a fixed clock rate, by a scanning-rate converter, the scanning-rate converter outputting the parameter with a variable clock pulse for further processing;
   wherein the variable clock pulse corresponds to a multiple of the tooth-meshing frequency of the milling tool, the tooth-meshing frequency corresponding to a product of a rate of rotation of the milling tool and a number of cutting blades of the milling tool; and
   wherein the tooth-meshing frequency is filtered out of the parameter output with a variable clock rate by averaging, by a moving-average filter, across a number of values that corresponds to the multiple of the tooth-meshing frequency.

2. The method according to claim 1, wherein the variable clock pulse corresponds to (a) five to twenty times and/or (b) ten times the tooth-meshing frequency of the milling tool.

3. The method according to claim 1, further comprising integrating the parameter in the moving-average filter in an integration stage and subsequently differentiating the parameter in a differentiation stage.

4. The method according to claim 3, wherein the differentiation stage includes a shift register having a number of register slots that corresponds to the multiple of the tooth-meshing frequency, through which consecutive parameter values are shifted at a time delay.

5. The method according to claim 4, wherein the shift register includes ten register slots.

6. The method according to claim 1, further comprising converting the parameter at an input of the moving-average filter from a floating point number to an integer number, and converting the parameter at an output of the moving-average filter from an integer number to a floating point number.

7. The method according to claim 1, further comprising triggering a warning and/or a termination of the milling operation in accordance with a comparison of the parameter output at an output of the moving-average filter with a limit value.

8. A numerical control for controlling a milling operation on a machine tool, comprising:
   a monitor unit adapted to monitor a temporally variable parameter of the numerical control with the aid of a limit value;
   an averaging filter adapted to filter out a tooth-meshing frequency of a milling tool from a time characteristic of the parameter; and
   a scanning rate converter adapted to process the parameter, measured in a fixed clock rate, and to output the parameter with a variable clock pulse for further processing;
   wherein the variable clock pulse corresponds to a multiple of the tooth-meshing frequency of the milling tool, the tooth-meshing frequency corresponding to a product of a rate of rotation of the milling tool and a number of cutting blades of the milling tool; and
   wherein the tooth-meshing frequency is filtered out of the parameter output with a variable clock rate by averaging, by a moving-average filter, across a number of values that corresponds to the multiple of the tooth-meshing frequency.

9. The numerical control according to claim 8, wherein the averaging filter includes a moving-average filter having an integration stage and a downstream differentiation stage.

10. The numerical control according to claim 9, wherein the differentiation stage includes a shift register having a number of register slots that corresponds to a multiple of the tooth-meshing frequency, the shift registers adapted to store consecutive parameter values.

11. The numerical control according to claim 10, wherein the shaft register includes ten register slots.

12. The numerical control according to claim 8, wherein the scanning-rate converter is connected upstream from the averaging filter.

13. The numerical control according to claim 8, wherein the variable clock pulse corresponds to (a) five to twenty and/or (b) ten times the tooth-meshing frequency of the milling tool.

14. A numerical control for controlling a milling operation on a machine tool, comprising:
   a monitor unit for monitoring a temporally variable parameter of the numerical control with the aid of a limit value;
   an averaging filter for filtering out a tooth-meshing frequency of a milling tool from a time characteristic of the parameter; and
   a scanning rate converter for processing the parameter, measured in a fixed clock rate, for outputting the parameter with a variable clock pulse for further processing;
   wherein the variable clock pulse corresponds to a multiple of the tooth-meshing frequency of the milling tool, the tooth-meshing frequency corresponding to a product of a rate of rotation of the milling tool and a number of cutting blades of the milling tool; and
   wherein the tooth-meshing frequency is filtered out of the parameter output with a variable clock rate by averaging, by a moving-average filter, across a number of values that corresponds to the multiple of the tooth-meshing frequency.

* * * * *